United States Patent [19]
Kallman

[11] Patent Number: 5,957,357
[45] Date of Patent: Sep. 28, 1999

[54] FLEXIBLE RECEPTACLE DEVICE

[75] Inventor: Robert Kallman, Weehawken, N.J.

[73] Assignee: Kallman Research Corporation, Whitestone, N.Y.

[21] Appl. No.: 08/779,407

[22] Filed: Jan. 7, 1997

[51] Int. Cl.⁶ .................................................. A45F 3/00
[52] U.S. Cl. ........................ 224/675; 224/676; 224/242; 224/930
[58] Field of Search .................... 224/671, 672, 224/674, 675, 676, 235, 236, 242, 901.8, 578, 583, 627, 637, 640, 153, 930; 190/102

[56] References Cited

U.S. PATENT DOCUMENTS

| | | |
|---|---|---|
| Re. 30,899 | 4/1982 | Kallman . |
| 2,049,293 | 7/1936 | Fink ........................................ 224/675 |
| 2,105,319 | 1/1938 | Hedden et al. .......................... 224/153 |
| 2,224,568 | 12/1940 | Altorfer .................................... 224/578 |
| 2,528,192 | 10/1950 | Urban . |
| 2,689,594 | 9/1954 | Wendt . |
| 2,710,639 | 6/1955 | Farls ....................................... 224/675 |
| 2,761,481 | 9/1956 | Boatwright . |
| 3,011,687 | 12/1961 | Boyt ........................................ 224/674 |
| 3,321,068 | 5/1967 | Beach . |
| 3,565,303 | 2/1971 | Kippen .................................... 224/675 |
| 4,051,554 | 10/1977 | Kallman . |
| 4,055,873 | 11/1977 | Kallman . |
| 4,153,089 | 5/1979 | Veilleux . |
| 4,168,544 | 9/1979 | Kallman . |
| 4,196,817 | 4/1980 | Moser . |
| 4,236,658 | 12/1980 | Kallman . |
| 4,418,733 | 12/1983 | Kallman . |
| 4,813,082 | 3/1989 | Kallman . |
| 4,858,800 | 8/1989 | Holtzclaw, Jr. et al. ............... 224/675 |
| 4,933,992 | 6/1990 | Kallman . |
| 4,953,767 | 9/1990 | Bennet .................................... 224/674 |
| 5,048,734 | 9/1991 | Long ....................................... 224/675 |
| 5,215,237 | 6/1993 | Wu .......................................... 224/671 |
| 5,215,238 | 6/1993 | Baruch .................................... 224/674 |
| 5,409,153 | 4/1995 | Ristich .................................... 224/674 |
| 5,419,473 | 5/1995 | Lamar ................................... 224/901.8 |
| 5,586,706 | 12/1996 | Ritzenhein ............................. 224/671 |
| 5,586,707 | 12/1996 | Haskell ................................... 224/242 |

FOREIGN PATENT DOCUMENTS 387473  10/1962  Switzerland .

*Primary Examiner*—Henry J. Recla
*Assistant Examiner*—Gregory M. Vidovich
*Attorney, Agent, or Firm*—Milde, Hoffberg & Macklin, LLP

[57] ABSTRACT

A device for holding objects, comprising a receptacle having a having a flexible wall, a potential space and at least one open end leading to the potential space, adapted for holding an object therewithin; a strap, forming a passage between the flexible wall and the strap; and a flexible elongated supporting member affixed to the flexible wall, having an encircling portion adapted to pass through the passage and around the receptacle. The device preferably comprises flexible front and rear panels, the front and rear panels being secured to each other along the respective sides and bottoms to form a potential space. The strap is preferably on the rear, forming a space between the rear panel and the rear strap, with the flexible elongated supporting member affixed to the rear panel. The rear strap is preferably held between a junction of the front and rear panels; and the flexible elongated supporting member preferably has a pair of intersecting elongated elements affixed to the rear panel above the rear strap, the encircling portion being distal to an intersection of the elongated elements. The receptacle may be used to carry and protect a cellular telephone or other electronic communication device, and may further include an elastic loop protruding from a lateral portion of the receptacle near an opening of the potential space and passing through at least one bead, the elastic loop being adapted to ensnare an antenna.

19 Claims, 3 Drawing Sheets

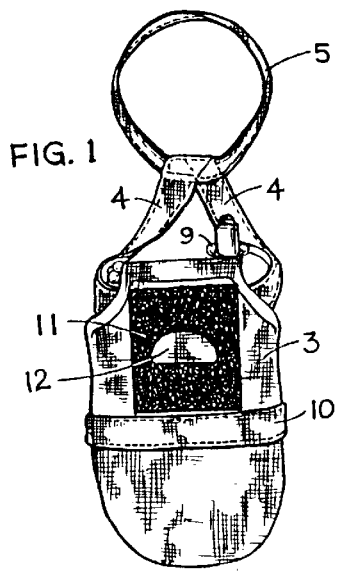
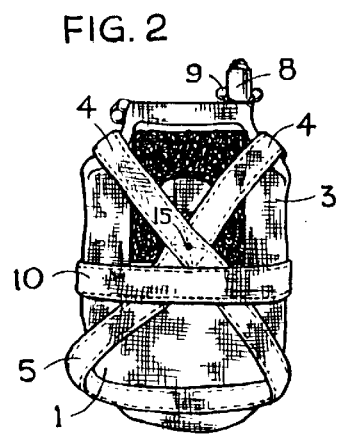
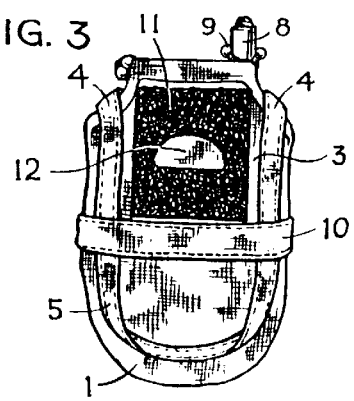
FIG. 1   FIG. 2   FIG. 3
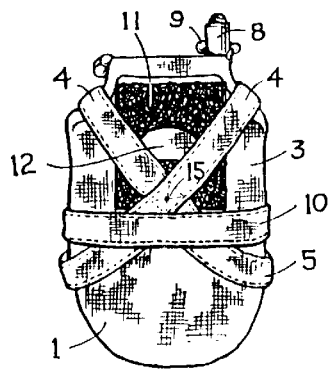
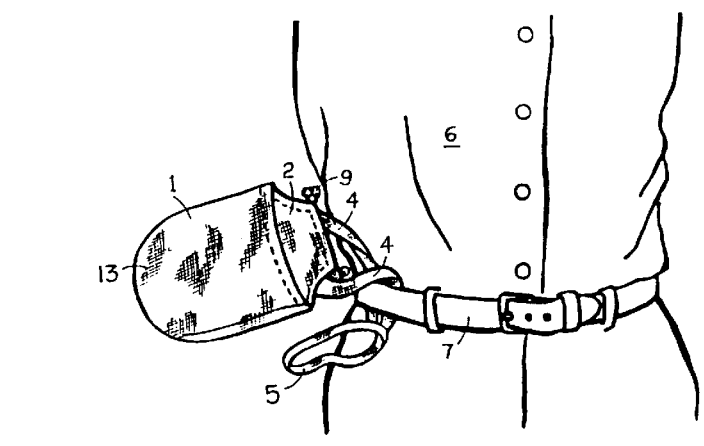
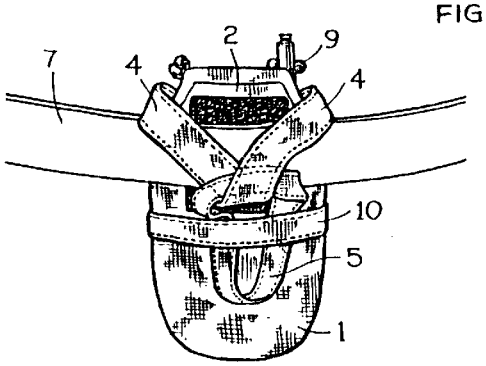
FIG. 4   FIG. 5   FIG. 6

FLEXIBLE RECEPTACLE DEVICE

FIELD OF THE INVENTION

The present invention relates to the field of flexible receptacle devices, more particularly to the field of flexible receptacle devices holding and supporting hand-holdable objects, being adapted to retain the objects upright.

BACKGROUND OF THE INVENTION

A holding device is disclosed in U.S. Pat. No. 4,418,733, as well as U.S. patent application Ser. Nos. 08/493,650, filed Jun. 22, 1995, entitled "Flexible Receptacle Device", and U.S. patent application Ser. Nos. 08/585,104, filed Jan. 11, 1996, entitled "Flexible Receptacle System", each of which is expressly incorporated herein by reference. An article holding system is disclosed in U.S. Pat. No. 4,168,544. A further system for holding articles to objects is disclosed in U.S. Pat. No. 4,236,658. See also, U.S. Pat. Nos. Re. 30,899, 4,055,873, 4,051,554, 2,528,192, 2,689,594, 2,761,481, 3,321,068, 4,153,089, 4,196,817 and Swiss Patent CH 387, 473. A mitten with an included pocket is disclosed in U.S. Pat. Nos. 4,933,992 and 4,813,082, expressly incorporated herein by reference.

Known holding devices are formed of flexible fabric, sewn together into a pocket configuration with an open top. These devices were employed, for example, to hold and insulate cooled or heated beverages in cans or cups, hold pads and writing instruments, sunglasses, cellular telephones, etc.

SUMMARY OF THE INVENTION

The present invention provides improvements in belt loop support structures for receptacle devices.

According to an embodiment of the present invention, a hook and loop fastener is provided for supporting the receptacle, wherein the loop portion of the fastener is attached to the rear of the receptacle, in order to make the receptacle more compatible with its environment of use, i.e., to prevent ripping of clothing or scratching of skin. According to a still further aspect of the invention, the hook and loop fastener is directional, having an increased adhesion force along one axis. The strong adhesion axis is aligned to markedly increase support of the receptacle against gravity, while allowing lower force for removal against gravity.

In order to provide flexible configuration, a patch of loop portion of hook and loop fastener is provided on the rear panel. This allows the receptacle device to be supported on another object, for example a car door or dashboard.

Another aspect of the invention provides a split strap, extending from lateral aspects of an upper portion of the receptacle, converging in a "V" configuration, so that the strap may be wrapped around a horizontally extending member to support the receptacle in an upright position. The strap is preferably held at its lower aspect by an encircling loop which extends around the entire receptacle, along a horizontal axis. In order to prevent the encircling loop from riding up on the receptacle, a rear strap is preferably provided, extending from the lateral seams around the rear of the receptacle. The encircling strap is passed under the rear strap and around the receptacle for insertion. Therefore, the rear strap is hidden behind the receptacle and limits the vertical rise of the encircling strap and hence the V-shaped split strap.

According another aspect of the present invention, front and rear panels of material are provided, with the rear panel extending above the front panel, thus lowering the center of gravity. Further, a beverage can inserted into the receptacle may be poured or sipped while the can is in the receptacle with reduced risk of wetting the receptacle material. The lateral upper edges of the rear panel converge upwardly.

The receptacle device may also be formed with additional panels of material, for example, front, rear and bottom, or front, rear, left, right and bottom. Further, the receptacle device may be formed as a tube with one closed end. It is therefore understood that the receptacle has a recess with at least one open end, adapted for holding an object therewithin when the open end is pointed upward, and that many known fabrication methods are possible. Further, according to the present design, the front and rear aspects of the receptacle are primarily relevant to the orientation of the supporting member, which is generally on the rear side, and the rear strap, which is generally also on the rear side. However, the design of the receptacle device admits of other orientations of these elements.

A still further aspect of the present invention provides an elastic band stretching across the top of the receptacle, the elastic band having a loop or separated loops with one or more beads around each elastic band loop or loops, allowing the tensioned parallel elastic band loop to be separated by tactile feel and pulling on the bead(s). The elastic band may be placed around an upwardly extending member, such as the antenna of a cellular telephone. The elastic band loop may pass through a hollow cylindrical element, e.g., a tube. Multiple elastic bands may be provided, for example two, to allow greater flexibility in the orientation of the object placed in the receptacle.

A preferred receptacle is thus formed of a front and rear panel, joined at the sides and bottom. The junction of the side and bottom portions are provided as tapered or rounded corners, reducing the distortion of the receptacle panels as thick objects are placed within.

A cellular telephone antenna retaining means may be provided on the receptacle, for example near a lateral aspect of the upper edge of the rear panel, providing top and bottom holding and security, with safe, fast and easy insertion and removal of the cellular telephone. Alternately, a cellular phone may be inserted in an inverted condition for ease of connection to external wiring, for example a car adapter.

It is therefore an object according to the present invention to provide a receptacle having support means for attachment to a horizontally oriented member, comprising a pouch having a potential space, an upper opening, and closed sides and bottom, having a vertically oriented flexible member for supporting an upper portion of the rear of the receptacle, terminating in a circular strap having a diameter approximating the diameter of the receptacle. At the level where the supporting strap is desired to be held, a further strap, affixed to the receptacle at its two sides in a horizontal orientation, is provided. In use, the circular strap is passed under the further strap, around the receptacle, and is held in place.

The supporting strap and the encircling strap may be a single strap, fastened at a point to form the encircling loop. Since the supporting strap is preferably split, the resultant supporting structure has a figure-"8" appearance.

Alternately or additionally, a vertical opening or channel may also be provided between the rear of the device and a portion of the sewn-on rear loop portion of the hook and loop fastener, e.g., Velcro® fastener in order to attach or suspend the device form, e.g., a woman's shoulder bag. The channel may also be used for attaching an external strap, which in turn may be used to attach the receptacle to other objects. This external strap may be formed with a pass through opening, so that when the end passes through the opening and around the fastener portion, and the end of the external strap is held, it remains attached to the receptacle. The external strap, for example, can pass over the opening of the receptacle, and attach to the encircling strap, for example by hook and loop fastener material, to hold an object in the receptacle even if it does not have an upward protrusion suitable for being ensnared by the antenna loop. The rear patch of fastener may be provided with an aperture, so that a portion of the patch is sewn on four sides or fully adhered to the receptacle, while another portion is sewn or adhered only at its lateral edges.

It is therefore also an object of the invention to provide a device for holding objects, comprising a receptacle having a having a flexible wall, a potential space and at least one open end leading to the potential space, adapted for holding an object therewithin; a strap, forming a passage between the flexible wall and the strap; and a flexible elongated supporting member affixed to the flexible wall, having an encircling portion adapted to pass through the passage and around the receptacle.

It is a further object of the invention to provide a strap affixed to the flexible wall of the receptacle, at opposite sides thereof, encircling about half of the receptacle. In this case, the flexible elongated supporting member may be affixed to the flexible wall above and on a same side as the strap.

It is a still further object of the invention to provide a receptacle having a strap with a pair of attachment points, providing an inelastic suspension near the attachment points for retaining the flexible elongated supporting member just below the strap.

In a preferred embodiment, the receptacle according to the invention is formed of a front panel and a rear panel, sewn on three sides, however, the receptacle may be any structure having a recess and an open end. The open end, in turn, may have a cover flap or other closure.

In a preferred embodiment, the elongated supporting member is split as a pair of straps forming a V, with the encircling portion distal to an intersection of the split elongated elements. The elongated supporting member and encircling member may also be formed as a continuous loop having an intersection.

The preferred embodiment also includes an elastic loop protruding from a portion of the receptacle near the open end of the potential space. This loop is adapted to ensnare a cellular telephone antenna. In order to prevent the loop from slipping into a seam of the receptacle, the elastic loop passes through a bead having an aperture, larger than an opening in the seam. This loop may serve as a portion of an antenna enhancement system, for example to provide increased signal for a radio frequency communication or receiving device, such as a radio, television or cellular telephone. For example, the loop may be electrically conductive and form a circuit with an appropriate external antenna, or even integrate the user as a portion of the antenna system.

The preferred embodiment has a portion of an adherent fastener system disposed on the flexible wall. For example, a loop portion of a hook-and-loop fastener system is sewn to the flexible wall. To attach the receptacle to a vertical object, a vertically oriented potential space is formed behind at least a portion of the adherent fastener system.

For a full understanding of the present invention, reference should now be made to the following detailed description of the preferred embodiments of the invention as illustrated in the accompanying drawings.

BRIEF DESCRIPTION OF THE DRAWINGS

The preferred embodiments of the invention will be shown by way of drawings of the Figures, in which:

FIG. 1 is a rear view of a receptacle according to the present invention;

FIG. 2 is a rear view of a receptacle according to the present invention with the encircling strap passed under the rear strap;

FIG. 3 is a rear view of an alternate embodiment with the encircling strap and suspension strap provided as a unitary structure, passed under the rear strap;

FIG. 4 is a rear view of the receptacle according to FIG. 2 with the encircling strap in a supported position;

FIG. 5 is a front perspective view of the receptacle according to the present invention with the encircling strap passed under a waist belt;

FIG. 6 is a rear view of the receptacle according to FIG. 5 with the encircling strap passed under the rear strap;

DESCRIPTION OF THE PREFERRED EMBODIMENTS

Figure 7:
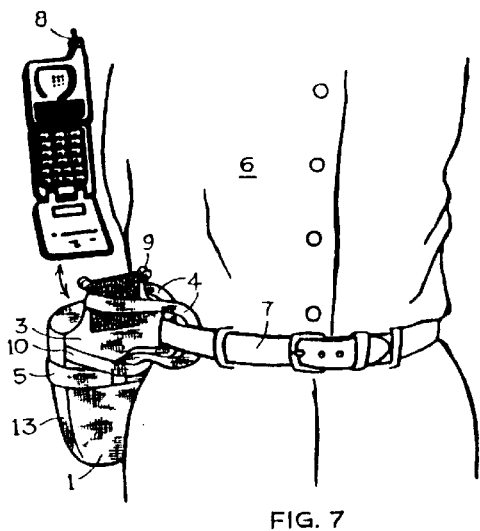
FIG. 7 is a rear perspective view of the receptacle according to FIG. 5 with the encircling strap in a supported position.

The preferred embodiments of the present invention will now be described with reference to FIGS. 1–13. Identical elements in the various figures of the present invention are designated with the same reference numerals.

A receptacle device is disclosed in U.S. Pat. No. 4,418, 733, which is incorporated herein by reference. The present receptacle is an improvement of the design of U.S. Pat. No. 4,418,133 having an improved belt loop supporting scheme.

A receptacle device 1 is provided as a front panel 13 and a rear panel 3, each preferably formed of leather with a Trico® backed Vel-foam® material liner, sewn on the lower and lateral sides to form a pocket, and leaving a potential space. The junction between the sides and bottom of the front 13 and rear 3 panels are preferably tapered or rounded. The preferred design is, when flat, approximately 4 inches wide, with the front panel 13 being approximately 5 inches tall, and the bottom corners rounded with an approximately 1.5 inch radius. The rear panel 3 is approximately 6 inches tall, with the lateral edges extending above the front panel 13 being inwardly tapered. The rear panel 3 has on overpocket portion which extends approximately 3 inches downward from the apex of the rear panel 3, with the edges of the overpocket which extend below the front panel 13 free.

The upper edge 2 of the rear panel 3 is sewn approximately 0.25 inch from its apex. At the upper edge 2 fold, an antenna 8 retaining loop 9 is provided, formed of a thin elastic band is placed in between the rear panel 3 and the overpocket. One end of the thin elastic band is sewn into the seam at each end, and traverses the width of the upper edge 2 fold. One or more beads, 4 mm to 6 mm in diameter, having a central aperture, are placed around the thin elastic band at each end, the beads each being larger than the side aperture of the upper edge 2 fold. The thin elastic band is provided to encircle an upward protrusion of an object placed in the receptacle, such as a cellular telephone antenna 8.

The thin elastic band may pass through a hollow cylinder, i.e., a straw or tube, laying across the top of the receptacle in the folded over seam. In this case, the thin elastic band passes through the hollow cylinder once, the two free ends are drawn together and sewn into the seam near the upper edge 2.

The front panel 13 preferably has a sewn hem 14 at an upper edge with a plastic stiffening sheet along its length (not shown) to resist rolling and to flatten the receptacle when empty. The front panel 13 and the rear panel 3 are joined by sewing.

Approximately bisecting the rear panel 3 is provided a strap 10, sewn into the side seams between the front panel 13 and the rear panel 3. This rear strap 10 is normally situated around the rear of the receptacle 1. Above the rear strap 10 is a patch of loop portion of hook and loop fastener material 11, which has a central aperture 12. The lower portion of the patch of material 11 is sewn to the rear panel 3 on four sides, while an upper portion including the aperture 12 is sewn on three sides, leaving a passage through the aperture 12, under the patch of material 11, and out an upper edge of the patch of material 11.

As shown in FIGS. 1 and 5–8, a split V-shaped strap 4 is provided extending from the sewn seam of the tapered edges near the upper folded edge 2 of the rear panel 3. Each portion of the split V-shaped strap 4 is approximately 3.5 inches long, and meet just above the rear strap 10, at a junction with an encircling strap 5. The encircling strap 5 is a loop approximately 9 inches in length, which fits around the receptacle 1 at the level of the rear strap 10 which provides a means to secure the receptacle 1 about a waist belt 7 of a wearer as shown in FIG. 5–8.

In an alternate embodiment, as shown in FIGS. 2–3, the split V-shaped strap 4 and the encircling strap 5 may be formed of a single filament, joined by, for example, a rivet 15 or by sewing. In a further embodiment, as shown in FIG. 3, the split V-shaped strap 4 and encircling strap 5 are a single, continuous filament which are not joined.

Figure 8:
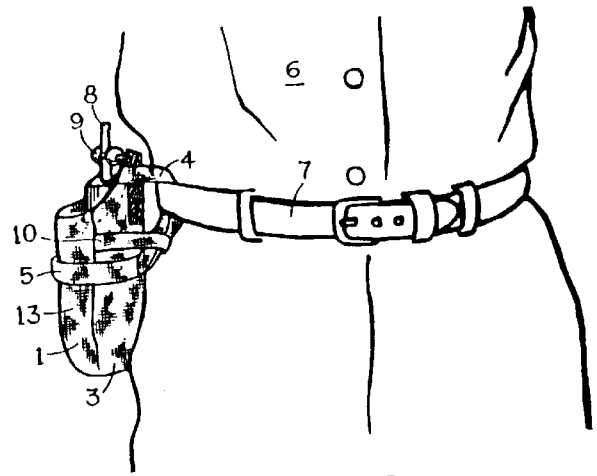
FIGS. 8 and 9 are side and front views of the receptacle according to FIG. 5 with a cellular telephone therein supported in the receptacle with an antenna encircling elastic member.
Figure 9:
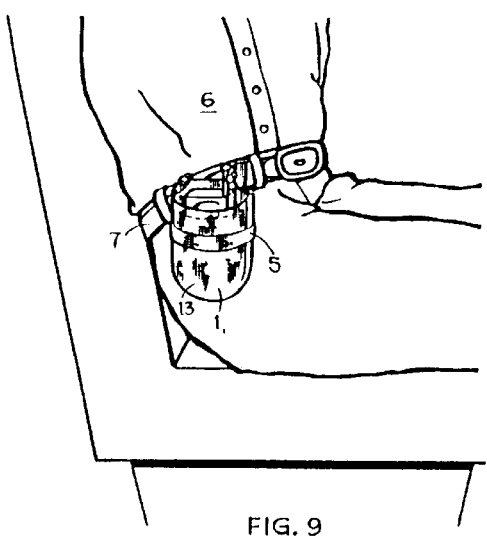
Figure 10:
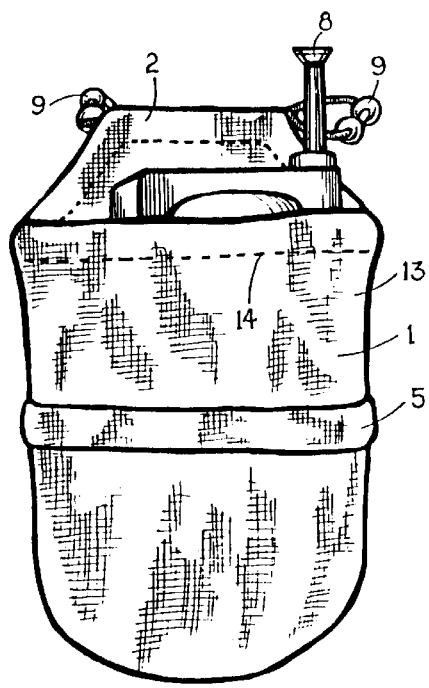
FIGS. 10 and 11 are front views of the receptacle according to FIG. 5 with a cellular telephone therein supported in the receptacle detailing the placement of an antenna encircling elastic member.
Figure 11:
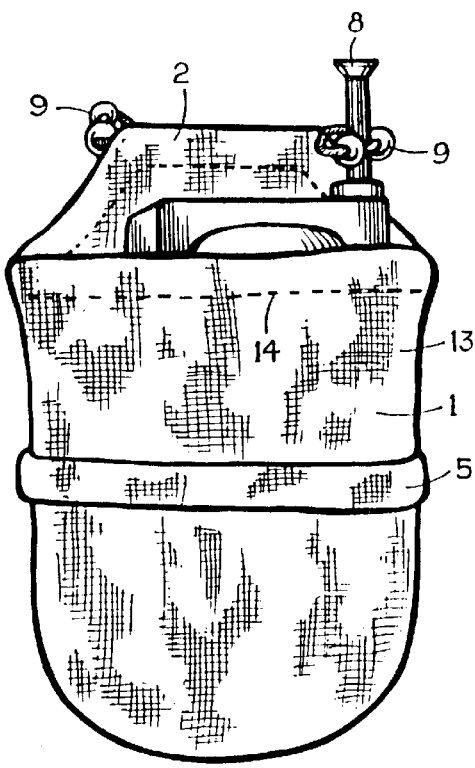

In any case, the encircling strap 5 is passed under the rear strap 10, as shown in FIGS. 2, 3, and 6, and then around the receptacle 1, as shown in FIGS. 4, 7 and 8.

In this configuration, only the encircling strap, and no buttons, hooks or snaps are present on the front of the receptacle. Therefore, the rear strap, which is firmly sewn into the seams laterally, prevents the encircling strap from riding up on the receptacle.

Figure 13:
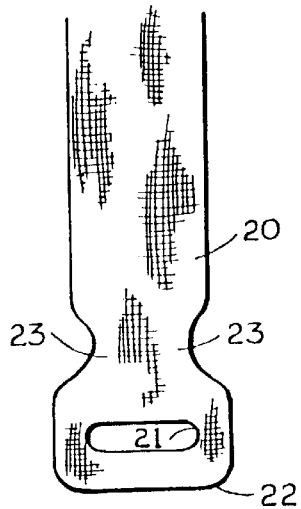
FIGS. 12 and 13 show an external strap for holding an object within the receptacle.
Figure 12:
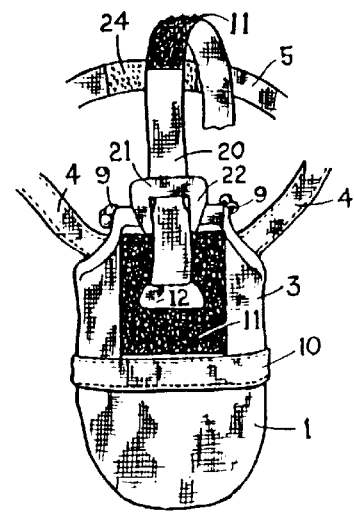

FIG. 13 shows an external strap 20, which is provided with an aperture 21 near one end 22. Advantageously, the end 22 has a width greater than a width of the remainder of the strap 20, so that the strap 20 may fit through the aperture 21 without deformation. Further, distal from the end 22, beyond the aperture 21, the strap 20 preferably has an concave tapers 23. The entire strap 20 may be formed, for example, from loop portion of hook and loop fastener material. As shown in FIG. 12, the end 25 of the external strap 20 may be passed through the opening 12 of the fastener portion 11, and then through the aperture 21, looping around itself The encircling strap 5, in turn, may be provided on its inner surface, with a hook portion 24 of hook and loop fastener material, which adheres to the strap 20, which is loop portion. Thus, the external strap 20 passes over the aperture of the flexible receptacle and holds an object within.

There has thus been shown and described novel receptacles and novel aspects of receptacles which fulfill all the objects and advantages sought therefor. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A device for holding objects, comprising:
   a receptacle having a flexible wall, a potential space and at least one open end leading to the potential space, adapted for holding an object therewithin;
   an elastic loop protruding from an aperture formed in said flexible wall of said receptacle, near an opening of said potential space, said elastic loop being retained outside said aperture by an element coupled to said elastic loop;
   a strap affixed to said receptacle at two positions, forming a narrow passage therebetween; and
   a flexible elongated supporting member affixed to said flexible wall, having an encircling portion adapted to pass through said narrow passage and around said receptacle, causing a constriction of said flexible wall to thereby exert an inward force against an object in said potential space.

2. The device according to claim 1, wherein said receptacle comprises a front panel and a rear panel.

3. The device according to claim 2 wherein said strap is held between a side junction of said front and rear panels.

4. The device according to claim 2, wherein said flexible elongated supporting member is affixed to said rear panel above said strap.

5. The device according to claim 1, wherein said flexible elongated supporting member comprises a pair of intersecting elongated elements.

6. The device according to claim 5, wherein said encircling portion is distal to an intersection of said elongated elements.

7. The device according to claim 6, wherein said flexible elongated supporting member and said encircling portion are formed of a continuous loop having said intersection.

8. The device according to claim 1, wherein said elastic loop is adapted to ensnare a cellular telephone antenna.

9. The device according to claim 1, wherein said element comprises at least one bead through which said elastic loop passes.

10. The device according to claim 1, having a portion of an adherent fastener system disposed on said flexible wall.

11. The device according to claim 10, wherein said adherent fastener system comprises a hook-and-loop fastener.

12. The device according to claim 10, wherein said adherent fastener system comprises a planar structure forming a vertically oriented potential tunnel between said adherent fastener system portion and said flexible wall.

13. The device according to claim 1, wherein said strap is affixed to said flexible wall at opposite sides thereof, encircling about half of said receptacle.

14. The device according to claim 13, wherein said flexible elongated supporting member is affixed to said flexible wall above and on a same side as said strap.

15. The device according to claim 1, wherein said strap provides an inelastic suspension near said two positions for retaining said flexible elongated supporting member below said strap.

16. The device according to claim 1, wherein:

(a) said receptacle comprises front and rear panels;

(b) said strap is held between a junction of said front and rear panels;

(c) said flexible elongated supporting member comprises a pair of intersecting elongated elements affixed to said rear panel above said rear strap, said encircling portion being distal to an intersection of said elongated elements;

wherein said clement comprises at least one bead through which said elastic loop passes, said elastic loop being adapted to ensnare a cellular telephone antenna.

17. A device for holding objects, comprising:

a receptacle having a flexible wall, a potential space and at least one open end leading to the potential space, adapted for holding an object therewithin;

an elastic loop protruding from an aperture formed in said flexible wall of said receptacle, near an opening of said potential space, said elastic loop being retained outside said aperture by an element coupled to said elastic loop;

a strap, affixed to said flexible wall at two positions and forming a narrow passage therebetween; and a flexible elongated member having a looped portion, passing through said passage and encircling said receptacle with said looped portion, such that tension on said flexible elongated member through said passage causes a constriction of said looped portion around said flexible wall and thereby to exert an inward force against an object within said receptacle.

18. A device for holding objects, comprising:

a receptacle having a flexible wall, a potential space and at least one open end leading to the potential space, adapted for holding an object therewithin;

a strap, forming a passage between said flexible wall and said strap;

a flexible elongated supporting member affixed to said flexible wall, having an encircling portion adapted to pass through said passage and around said receptacle; and an elastic loop protruding from a portion of said receptacle near said open end of said potential space, said elastic loop passing through at least one bead.

19. The device according to claim 18, wherein:

(a) said receptacle comprises front and rear panels;

(b) said strap is held between a junction of said front and rear panels; and (c) said flexible elongated member comprises a pair of intersecting elongated elements affixed to said rear panel above said rear strap, said encircling portion being distal to an intersection of said elongated elements.

* * * * *